(12) United States Patent
Iijima

(10) Patent No.: US 7,715,110 B2
(45) Date of Patent: May 11, 2010

(54) ZOOM LENS SYSTEM

(75) Inventor: Kenji Iijima, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 36 days.

(21) Appl. No.: 12/246,835

(22) Filed: Oct. 7, 2008

(65) Prior Publication Data
US 2009/0097131 A1 Apr. 16, 2009

(51) Int. Cl.
G02B 15/14 (2006.01)
(52) U.S. Cl. .......................... 359/680; 359/689
(58) Field of Classification Search .................. 359/680, 359/681, 682, 683, 684, 686, 689
See application file for complete search history.

(56) References Cited
U.S. PATENT DOCUMENTS
2009/0290231 A1* 11/2009 Kanai et al. .................. 359/689

FOREIGN PATENT DOCUMENTS
JP 2001-296476 10/2001

* cited by examiner

Primary Examiner—Timothy J Thompson
(74) Attorney, Agent, or Firm—Thompson Hine LLP

(57) ABSTRACT

A zoom lens system consists, in order from an object side to an image-forming side, of a first negative lens group G1, a second positive lens group G2, and a third positive lens group G3. The first lens group G1 consists of one negative lens and one positive lens, the second lens group G2 consists of a cemented lens composed of a positive lens and a negative lens, and one meniscus lens that is concave on the image-forming side, the third lens group G3 consists of a single positive lens, and a combined focal length f2 of the second lens group, a focal length Lf23 of the meniscus lens of the second lens group, a combined focal length fw of the zoom lens system at a wide angle end, a combined focal length f3 of the third lens group, a radius of curvature Ro of an object side surface of the positive lens in the cemented lens, and a radius of curvature Ri of an image-forming side surface of the positive lens in the cemented lens satisfy the following conditions $0 < |f2/Lf23| < 0.3$ $-2.0 < Ri/Ro < -1.0$ $0.25 < fw/f3 < 0.45$.

7 Claims, 5 Drawing Sheets

Fig. 3

| | r | AS | d | nd | vd | D | |
|---|---|---|---|---|---|---|---|
| 1 | 34.801 | | 0.80 | 1.80400 | 46.6 | 10.10 | glass lens L11 |
| 2 | 5.593 | | 1.95 | | | 8.40 | |
| 3 | 12.762 | * | 1.65 | 1.84666 | 23.8 | 8.70 | glass lens L12 |
| 4 | 36.759 | * | d4 | | | 8.40 | |
| 5 | infinity | sto | 0.30 | | | 3.63 | stop S |
| 6 | 4.367 | | 2.44 | 1.77250 | 49.6 | 4.00 | glass lens L21 |
| 7 | -5.533 | | 0.80 | 1.69895 | 30.1 | 3.60 | glass lens L22 |
| 8 | 5.533 | | 0.54 | | | 3.30 | |
| 9 | 4.227 | * | 0.80 | 1.50940 | 56.5 | 3.40 | plastic lens L23 |
| 10 | 3.851 | * | d10 | | | 3.50 | |
| 11 | 39.387 | | 1.38 | 1.72916 | 54.7 | 6.30 | glass lens L31 |
| 12 | 19.393 | | d12 | | | 6.40 | |
| 13 | infinity | | 0.30 | 1.51633 | 64.1 | | OF1 |
| 14 | infinity | | 0.50 | | | | |
| 15 | infinity | | 0.50 | 1.51633 | 64.1 | | OF2 |

Fig. 4

| | K | A | B | C | D |
|---|---|---|---|---|---|
| 3 | 4.5950 | -3.1470E-04 | -6.0289E-06 | 2.1838E-07 | -3.9491E-09 |
| 4 | 0.0000 | -3.6015E-04 | -4.2972E-06 | 2.6954E-07 | -3.3554E-09 |
| 9 | -2.3702 | -4.1628E-03 | -1.6259E-03 | -4.5267E-05 | 5.3502E-06 |
| 10 | -0.2600 | -1.5545E-03 | -1.6411E-03 | 6.5570E-05 | 1.4299E-05 |

Fig. 5

| Zoom ratio | 3.0 | | |
|---|---|---|---|
| | W | M | T |
| Focal length | 5.270 | 9.128 | 15.809 |
| FNo | 3.128 | 4.123 | 5.630 |
| Field angle | 30.931 | 18.273 | 10.714 |
| Image height | 3.000 | 3.000 | 3.000 |
| BF | 0.500 | 0.500 | 0.500 |
| Total length of lens system | 31.328 | 26.810 | 26.576 |
| d4 | 13.351 | 5.637 | 0.426 |
| d10 | 3.171 | 7.368 | 12.523 |
| d12 | 2.346 | 1.345 | 1.168 |
| Entrance pupil position | 7.583 | 5.388 | 2.906 |
| Exit pupil position | −13.026 | −27.082 | −115.163 |
| Front principal point position | 10.800 | 11.495 | 16.554 |
| Back principal point position | −4.770 | −8.628 | −15.309 |

Fig. 6

| Lens | End surface | Focal length |
|---|---|---|
| L11 | 1 | −8.391 |
| L12 | 3 | 22.384 |
| L21/L22 | 6 | 9.755 |
| L23 | 9 | −301.433 |
| L31 | 11 | 18.000 |

Fig. 7

| Group | End surface | Focal length | Length of group | Front principal point position | Back principal point position |
|---|---|---|---|---|---|
| G1 | 1 | −14.919 | 4.40 | −0.401 | −3.822 |
| G2 | 6 | 9.288 | 4.58 | −2.855 | −4.462 |
| G3 | 11 | 18.000 | 1.38 | 0.540 | −0.266 |

ZOOM LENS SYSTEM

CROSS-REFERENCE TO RELATED APPLICATIONS

This application is based upon and claims the benefit of priority from the prior Japanese Patent Application No. 2007-266708, filed Oct. 12, 2007, the entire contents of which are incorporated herein by reference.

BACKGROUND

The present invention relates to a zoom lens system that is suited to mounting in a digital camera or an information terminal such as a mobile phone that is equipped with a digital camera function.

A digital camera that uses an image pickup device such as a CCD or a CMOS to obtain an image formed by a lens as digital data is known. An information terminal such as a mobile telephone, a cellular phone etc., in which a digital camera is incorporated is also known.

Japanese Laid-Open Patent Publication No. 2001-296476 discloses a zoom lens composed of three lens groups with negative, positive and positive refractive powers in that order from the object side, where the first group consists of two lenses, the second group consists of four lenses, and the third group consists of one lens, making a total of seven lenses. To make such zoom lens systems even more compact, there is demand for a further reduction in the number of lenses that construct the lens system.

SUMMARY

One aspect of the present invention is a zoom lens system including, in order from an object side thereof to an image-forming side thereof, a first lens group with negative refractive power, a second lens group with positive refractive power, and a third lens group with positive refractive power, wherein zooming is carried out by moving the first lens group, the second lens group, and the third lens group and focusing is carried out by moving the third lens group. The respective lens groups are arranged as follows.

The first lens group consists of one negative lens and one positive lens disposed in that order from the object side, wherein at least one surface out of surfaces of the negative lens and the positive lens is aspherical. The second lens group consists, in order from the object side, of a cemented lens composed of a positive lens and a negative lens, and one meniscus lens that is concave on the image-forming side, wherein one surface of the meniscus lens is aspherical and at least one surface out of a surface of the object side of the cemented lens, a surface of the image-forming side of the cemented lens, and another surface of the meniscus lens is aspherical. The third lens group consists of a single positive lens.

In addition, in this zoom lens system, a combined focal length f2 of the second lens group, a focal length Lf23 of the meniscus lens of the second lens group, a combined focal length fw of the zoom lens system at a wide angle end (short focal point end), a combined focal length f3 of the third lens group, a radius of curvature Ro of an object side surface of the positive lens in the cemented lens, and a radius of curvature Ri of an image-forming side surface of the positive lens in the cemented lens satisfy the following conditions.

$$0 < |f2/Lf23| < 0.3 \quad (1)$$

$$-2.0 < Ri/Ro < -1.0 \quad (2)$$

$$0.25 < fw/f3 < 0.45 \quad (3)$$

The zoom lens system consists of a total of six lenses. Condition (1) shows reducing the refractive power of the meniscus lens in the second lens group as a proportion of the refractive power of the second lens group, so that the lens is either a meniscus lens with almost no power or a negative or positive meniscus lens with low power. At least one surface of the meniscus lens is aspherical. By using an aspherical lens with almost no power or low power, in the second lens group that tends to have a small overall aperture to concentrate the light rays, it is possible to achieve a sufficient area for the aspherical surface to effectively correct aberration and to favorably correct aberration using a low number of lenses.

Condition (1) above makes it necessary to increase the power of the cemented lens in a second lens group that has an overall positive refractive power and is composed of a combination of a cemented lens and a low power lens (i.e., a lens with a low absolute refractive power). However, in the cemented lens, increasing of the spherical aberration and reduction of the correction performance for chromatic aberration are not favorable. For this reason, Condition (2) is also set. The lower limit in Condition (2) is effective in correcting spherical aberration produced by the object side surface of the cemented lens, and the upper limit in Condition (2) is effective in achieving sufficient correction performance for chromatic aberration at the telephoto end (the long focal point end).

The ratio of Ri/Ro should preferably also satisfy the following condition.

$$-1.7 < Ri/Ro < -1.15 \quad (2')$$

In this zoom lens system, at least one aspherical surface is provided in the first lens group and at least two aspherical surfaces are provided in the second lens group. By doing so, in particular the correction performance of the second lens group for various types of aberration is improved. Accordingly, it is possible to suppress the production of various types of aberration in the respective lens groups and to favorably correct such aberration even if the refractive powers of the respective lens groups are suppressed. This means that it is possible to make the refractive power of the third lens group comparatively low and to suppress the change in the angle of incidence of the light rays on the image pickup surface when zooming from the wide angle end to the telephoto end. Accordingly, it is possible to suppress the drop in the amount of light at the image pickup device (image pickup element) disposed at the image-forming plane on the image-forming side of the lens system. Condition (3) sets the power distributed to the third lens group. The upper limit in Condition (3) is effective in suppressing a drop in the amount of light at the image pickup device. The lower limit of Condition (3) is effective in suppressing increases in the distance moved when focusing is performed by the third lens group.

The meniscus lens of the second lens group should preferably be a plastic lens. The other surface of the meniscus lens should also be an aspherical surface. Since the zoom lens system is constructed of a total of only six lenses, even if the lenses aside from the meniscus lens, that is, the negative lens and positive lens of the first lens group, the cemented lens of the second lens group, and the positive lens of the third lens group are glass lenses, the zoom lens system as a whole will still be lightweight. Accordingly, glass lenses should preferably be used as the lenses aside from the meniscus lens of the second lens group as this will make it possible to suppress variations in lens performance due to environmental factors such as temperature.

In the first lens group, the object side of the positive lens should preferably be aspherical. This is effective in favorably correcting distortion at the wide angle end.

This zoom lens system has a high zoom ratio and favorable image-forming performance in spite of being compact. Accordingly, the present invention is suited to a camera, such as a digital camera, that includes a zoom lens system and an image pickup device that is disposed on the image-forming side of the zoom lens system, and to an information terminal that includes the camera function (digital camera) and a display device that is capable of displaying images from the image pickup device of the camera. Such camera and information terminal (such as a mobile telephone, a cellular phone) are included in the present invention.

BRIEF DESCRIPTION

The accompanying drawings, which are incorporated in and constitute a part of the specification, illustrate embodiments of the invention, and together with the general description given above and the detailed description given below, serve to explain the principles of the invention.

FIG. 3 shows data on the respective lenses in the example of the zoom lens system;

FIG. 4 shows the aspherical coefficients of the example of the zoom lens system;

FIG. 5 shows various data relating to zooming of the example of the zoom lens system;

FIG. 6 shows data on the individual lenses in the example of the zoom lens system;

FIG. 7 shows data for lens groups in the example of the zoom lens system;

DETAILED DESCRIPTION

Figure 1:
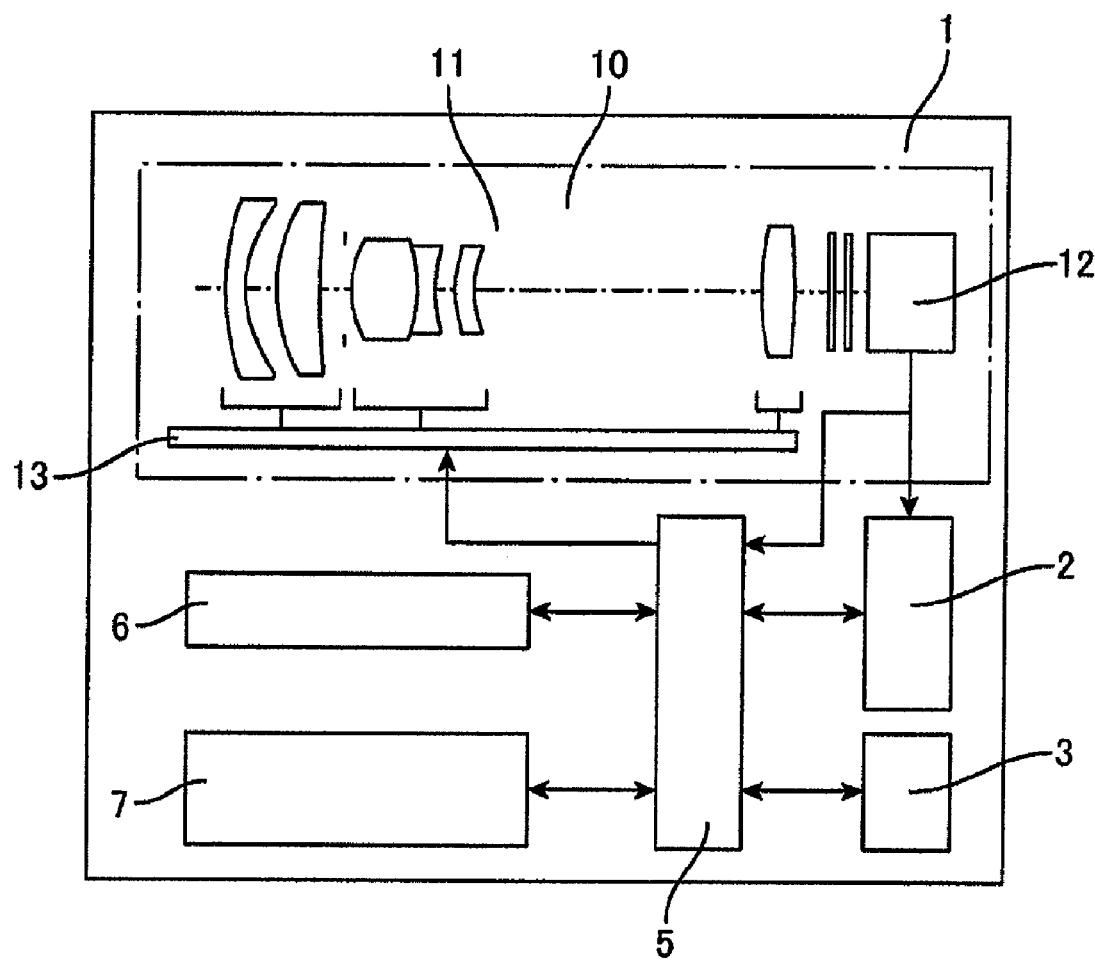
FIG. 1 is a diagram showing one example of an information terminal equipped with a camera function including a zoom lens system.

FIG. 1 shows the overall arrangement of an information terminal equipped with a camera function. In more detail, this information terminal 1 is a mobile phone equipped with a camera function or a PDA (Personal Data Acquisition, Personal Digital Assistance) equipped with a camera function. The information terminal 1 is equipped with a digital camera function 10 which includes a zoom lens system 11, an image pickup device 12 disposed at an image formation position (an image focus plane) of the zoom lens system 11, and a lens driving mechanism 13 that carries out a zooming operation by moving lens groups in the zoom lens system 11. The information terminal 1 further includes a display device 2, a data input/output device 3, a control unit 5 with functions such as a CPU, a memory device 6 such as a RAM disk and/or a hard disk, and a communication unit 7 for wirelessly connecting to a public telephone network and/or a computer network. The image pickup device 12 is a CCD or CMOS sensor, for example, and can convert an image formed by the zoom lens system 11 on an incident surface of the image pickup device 12 to digital data for displaying the data on the display device 2, storing the data in the memory device 6, and/or transmitting the data to another information terminal via the communication unit 7.

Figure 2A:
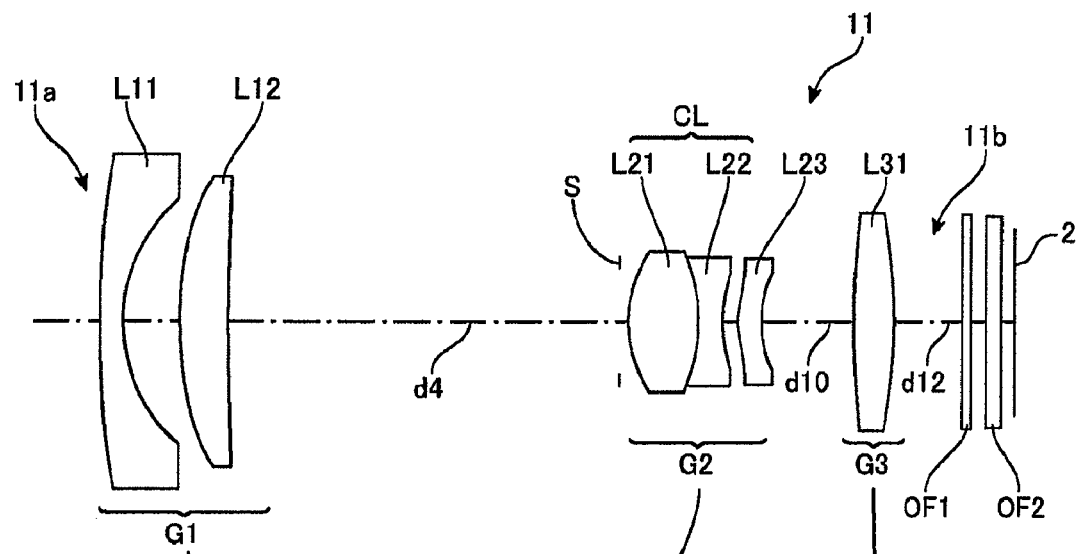
FIGS. 2A and 2B show the lens arrangements of the zoom lens system, with FIG. 2A showing the arrangement of lenses at a wide-angle end and FIG. 2B showing the arrangement of lenses at a telephoto end.
Figure 2B:
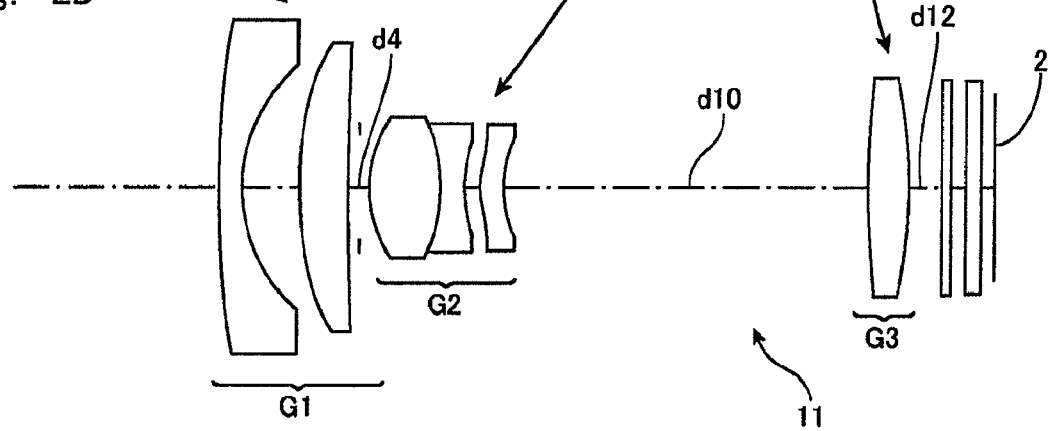

FIGS. 2A and 2B show the arrangements of one of embodiments of the zoom lens system 11 which has been extracted from FIG. 1. FIG. 2A shows the arrangement of lenses at a wide-angle end (a short focal point end) where an image of a larger subject is formed, while FIG. 2B shows the arrangement of lenses at the telephoto end (long focal point end). The zoom lens system 11 is oriented so that the image pickup device 12 is disposed at an image-forming side (image surface side, image-forming end) 11b thereof and an object side (subject end, object end) 11a that is the opposite end of the zoom lens system 11 faces the outside from the information terminal 1.

The zoom lens system 11 consists of six lenses numbered L11 to L12, L21 to L23, and L31 divided into three lens groups numbered G1 to G3 in that order from the object side 11a. These three lens groups G1 to G3 respectively have negative, positive, and positive refractive powers in that order from the object side 11a. The zoom lens system 11 as a whole is a retrofocus type and is telecentric or almost telecentric at the image-forming end 11b where the image pickup device 12 is provided, so that a sharp image can be produced on the image pickup device 12.

The first lens group G1 at the object side 11a has an overall negative refractive power. The first lens group G1 consists in order from the object side 11a of a negative meniscus lens L11 that is convex toward the object side 11a and a positive meniscus lens L12 that is convex toward the object side 11a. These lenses L11 and L12 are glass lenses and both surfaces S3 and S4 of the positive meniscus lens L12 are aspherical.

The second lens group G2 has an overall positive refractive power. The second lens group G2 consists in order from the object side 11a of a cemented lens (a balsam lens) CL composed of a positive biconvex lens L21 and a negative biconcave lens L22, and a low-power meniscus lens L23 that is concave toward the image-forming side 11b (and convex toward the object side 11a). Out of these lenses L21, L22, and L23, the lenses L21 and L22 are glass lenses and the lens L23 is a plastic lens. In addition, both surfaces S9 and S10 of the plastic lens L23 are aspherical and have positive refractive power at the center (i.e., for paraxial rays) and negative refractive power at the periphery.

The plastic lens L23 has almost no refractive power. By making the lens L23 a meniscus lens that is concave toward the image-forming side 11b, that is, convex toward the object side 11a, it is possible to increase the area of the aspherical surface that can be provided on the lens L23, thereby making it possible to improve the aberration-correcting performance of the lens L23. Also, even if the refractive power of the lens L23 is low, this will still affect the principal focal point of the second lens group G2, and therefore by using a meniscus lens that is convex toward the object side 11a as the lens L23, it is possible to bring the principal focal point of the second lens group G2 closer to the cemented lens CL.

The third lens group G3 is a lens group with positive refractive power and in this example has a single lens construction composed of a biconvex glass lens L31. Two optical filters OF1 and OF2 that are made of plastic are provided at the image-forming side 11b of the third lens group G3 before the image pickup device 12. A "stop" (aperture) S is also disposed on the object side of the second lens group G2.

As shown in FIGS. 2A and 2B, when zooming from the wide-angle end to the telephoto end, the third lens group G3 of the zoom lens system 11 moves toward the image-forming side 11b. The second lens group G2 moves toward the object side 11a so as to approach the first lens group G1. The first lens group G1 moves toward the image-forming side 11b so as to approach the second lens group G2. In addition, the third lens group G3 moves for focusing (i.e., to adjust the focal point). Accordingly, the first lens group G1, the second lens group G2, and the third lens group G3 are driven by the lens driving mechanism 13.

FIG. 3 shows the lens data. In the lens data, "r" represents the radius of curvature (mm) of each lens surface disposed in order from the object side, "AS" represents an aspherical surface, "d" represents the distance (mm) between the respective lens surfaces disposed in order from the object side, "nd" represents the refractive index (d line) of each lens in order from the object side, "vd" represents the Abbe number (d line) of each lens in order from the object side, and "D" the effective diameter (mm). The expression "infinity" indicates a flat surface. During zooming, the stop S moves together with the second lens group G2. For this reason, the distance d4 between the first lens group G1 and the stop S, the distance d10 between the second lens group G2 and the third lens group G3, and the distance between the third lens group G3 and the filter OF1 all vary.

Both surfaces S3 and S4 of the positive lens L12 of the first lens group G1 and both surfaces S9 and S10 of the meniscus lens (plastic lens) L23 of the second lens group G2 are aspherical. FIG. 4 shows the aspherical coefficients of these surfaces. The aspherical surfaces are expressed by the following expression using the coefficients K, A, B, C, and D shown in FIG. 4 with R as the radius of curvature, X as the coordinate in the optical axis direction, Y as the coordinate in a direction perpendicular to the optical axis, and the direction in which light propagates as positive.

$$X=(1/R)Y^2/[1+\{1-(1+K)(1/R)^2Y^2\}^{1/2}]+AY^4+BY^6+CY^8+DY^{10}$$

FIG. 5 shows various values during a zooming operation of the zoom lens system 11. Note that W is the wide-angle end (short focal point end), T is the telephoto end (long focal point end), and M is the middle. Such distances and lengths are expressed in mm units. "FNo" represents the F number and "BF" represents the back focus. FIG. 6 shows the lens data for the respective lenses, and FIG. 7 shows the data for the respective lens groups.

For the zoom lens system 11, when the combined focal length of the second lens group G2 is expressed as "f2", the focal length of the meniscus lens L23 of the second lens group G2 is expressed as "Lf23", the combined focal length of the zoom lens system 11 at the wide-angle end (short focal point end) is expressed as "fw", the combined focal length of the third lens group G3 is expressed as "f3", the radius of curvature of a surface S6 of the object side 11a (object side surface S6) of the positive lens L21 in the cemented lens CL is expressed as "Ro", and the radius of curvature of a surface S7 of the image-forming end 11b (image-forming side surface S7) of the positive lens L21 in the cemented lens CL is expressed as "Ri", the values of the Conditions (1) to (3) given above are as follows from the data shown in FIGS. 5 to 7.

| Condition (1) | (|f2/Lf23|) | 0.03 |
| Condition (2) | (Ri/Ro) | −1.27 |
| Condition (3) | (fw/f3) | 0.29 |

Accordingly, the zoom lens system 11 of the present embodiment satisfies Conditions (1) to (3) and satisfies a further Condition (2') explained above. The zoom lens system 11 is also compact with a construction that uses only six lenses. In addition, out of the six lenses that construct the zoom lens system 11, aside from the meniscus lens L23 of the second lens group G2, the other five lenses are glass lenses that are not susceptible to the effects of temperature, which means that the lens system has a stable optical performance. The lens system also has a high zoom ratio of "3" and favorably corrects aberration such as chromatic aberration of magnification, and can form a sharp image on the image pickup device 12.

Figure 8:
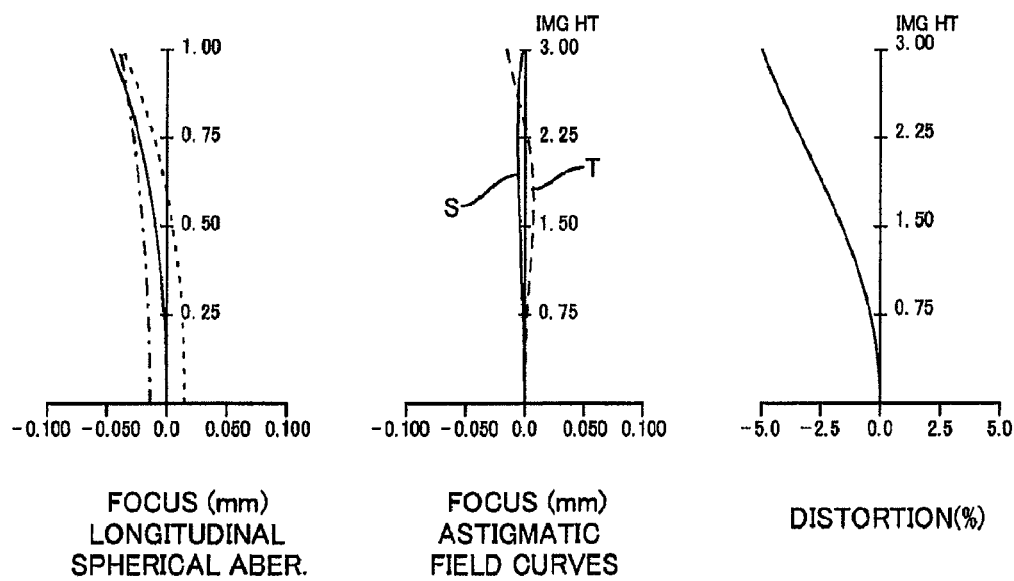
FIG. 8 is a vertical aberration graph for the example of the zoom lens system and shows various aberrations at the wide-angle end.
Figure 9:
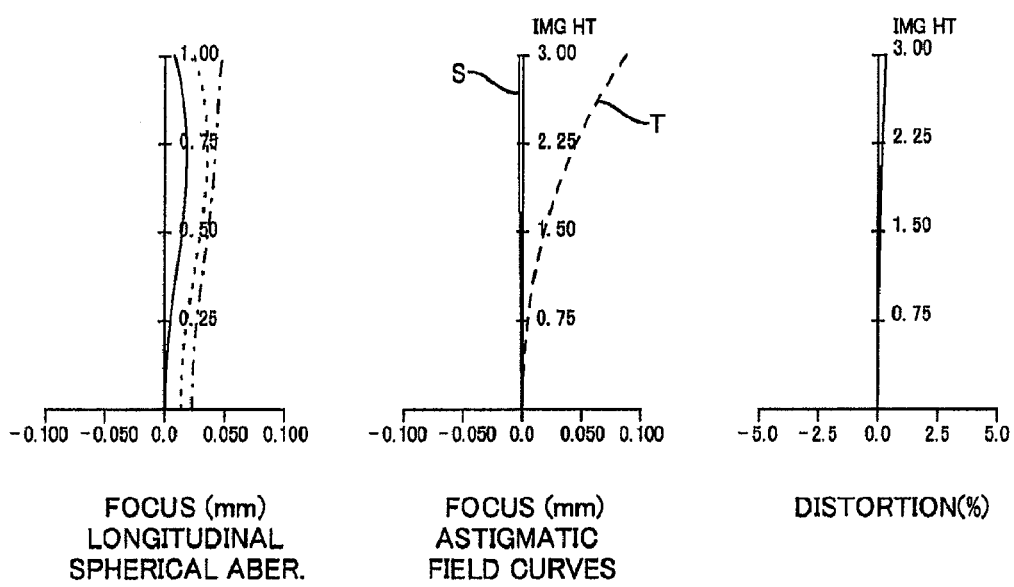
FIG. 9 is a vertical aberration graph for the example of the zoom lens system and shows various aberrations at the telephoto end.

FIG. 8 shows the spherical aberration, astigmatism, and distortion of the zoom lens system 11 of the present embodiment at the wide-angle end. FIG. 9 shows the spherical aberration, astigmatism, and distortion of the zoom lens system 11 of the present embodiment at the telephoto end. Values of the spherical aberration for the respective wavelengths of 656 nm (broken line), 587 nm (solid line), and 486 nm (dot-dash line) are shown. In addition, in the graphs showing the astigmatism, the aberration for tangential rays (T) and sagittal rays (S) are shown. In this way, although the zoom lens system 11 consists of six lenses, it is possible to project sharp images with a superior aberration correcting performance that is the match of a conventional zoom lens constructed of eight or nine lenses in three groups.

The zoom lens system 11 according to the present embodiment is constructed of a total of six lenses, so that it is easy to make the lens system lighter and more compact. This makes the lens system well suited to a camera function incorporated in an information terminal such as a mobile phone. In addition, during zooming, by also moving the third lens group G3 that is used for focusing, it is possible to correct movement of the image forming plane, which makes it possible to make the overall lens system 11 even shorter.

In addition, by satisfying Conditions (1) and (2), it is possible to favorably correct aberration without using a large number of plastic lenses, which means that it is possible to suppress the temperature dependency of the lens performance due to the use of a large number of plastic lenses. The zoom lens system 11 according to the present embodiment also satisfies Condition (2'), which is more preferable in terms of suppressing the temperature dependency of the optical performance of the lens system. This means that by using a camera function 10 equipped with the zoom lens system 11, it becomes possible for an information terminal used in a variety of environments to stably obtain sharp images.

Note that in the zoom lens system 11 according to the present embodiment, the second lens group G2 uses a plastic meniscus lens L23 that has a low refractive power and is positive for paraxial rays. On the other hand, it is also possible to use a plastic lens that has a low refractive power and is negative for all rays as the plastic meniscus lens L23. Making the overall refractive power of the second lens group G2 positive and the power of the lens L23 positive for paraxial rays is advantageous for producing a design where the second lens group G2 has sufficient refractive power. On the other hand, suppressing the power of the lens L23 within the range of Condition (1) and making the refractive power of the lens L23 negative for all rays is advantageous in making the zoom lens system 11 compact.

In the zoom lens system 11, the aberration correcting performance is improved by suppressing the power of the lens L23 and making both surfaces thereof aspherical. Therefore, the refractive power of the positive lens L21 of the cemented lens CL rises to achieve sufficient positive refractive power for the second lens group G2. In addition, to prevent a fall in performance due to the increased refractive power of the positive lens L21, the values are set so as to satisfy Condition (2), preferably Condition (2'). If the value "Ri/Ro" falls below the lower limit of the condition (2), it becomes difficult to correct the spherical aberration produced by the object side surface S6 of the positive lens L21. On the other hand, if the value "Ri/Ro" exceeds upper limit of the condition (2), it becomes difficult to correct the chromatic aberration at the long focal point end "T". In place of the surface S9 of the plastic meniscus lens L23, or in addition thereto, it is possible to make the object side surface S6 or the image-forming side surface S8 of the cemented lens CL aspherical. By replacing the meniscus lens L23 with a glass lens, it is possible to further suppress variations in performance due to temperature. On the other hand, by using a plastic lens as the meniscus lens L23, it is possible to reduce the cost of the zoom lens system 11.

Also, in this lens system, since the cemented lens CL with a relatively high refractive power is used and the second lens group G2 has an arrangement that the cemented lens CL is on the object side thereof, the distance between principal points for the first lens group and the second lens group is reduced. This makes it possible to achieve a high zoom ratio of "3" in spite of the lens system having an overall compact size.

In the first lens group G1, by making both surfaces S3 and S4 of the positive lens L12 aspherical, a sufficient aberration correcting performance is achieved with a two-lens construction. Accordingly, the first lens group G1 can be made compact. In the first lens group G1, the aspherical surface may be one surface of the positive lens L12 and/or one surface of the negative lens L11. Making the object side surface S3 of the positive lens L12 aspherical is also effective in correcting distortion at the short focal point end "W".

By making the third lens group G3 movable during both focusing and zooming, in addition to the moving of the first lens group G1, it is possible to correct movement of the image forming plane duo to zooming. Accordingly, it is possible to reduce the overall length of the lens system 11. If the value "fw/f3" falls below the lower limit of condition (3), the amount of movement of the third lens group G3 during focusing, or more specifically the amount of movement of the lens L31 increases, which is not favorable for miniaturizing the lens system 11. If the value "fw/f3" exceeds the upper limit of condition (3), when moving from the short focal point end "W" to the long focal point end "T", there is a large change in the angle at which light rays are incident on the image pickup device 12, which can lead to a larger drop in the amount of light at the image pickup device 12. This would also be unfavorable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A zoom lens system consisting, in order from an object side thereof to an image-forming side thereof, a first lens group with negative refractive power, a second lens group with positive refractive power, and a third lens group with positive refractive power,
    wherein zooming is carried out by moving the first lens group, the second lens group, and the third lens group and focusing is carried out by moving the third lens group,
    the first lens group consists of one negative lens and one positive lens disposed in that order from the object side, wherein at least one surface out of surfaces of the negative lens and the positive lens is aspherical,
    the second lens group consists, in order from the object side, of a cemented lens composed of a positive lens and a negative lens, and one meniscus lens that is concave on the image-forming side, wherein one surface of the meniscus lens is aspherical and at least one surface out of a surface of the object side of the cemented lens, a surface of the image-forming side of the cemented lens, and another surface of the meniscus lens is aspherical,
    the third lens group consists of a single positive lens, and
    a combined focal length f2 of the second lens group, a focal length Lf23 of the meniscus lens of the second lens group, a combined focal length fw of the zoom lens system at a wide angle end, a combined focal length f3 of the third lens group, a radius of curvature Ro of an object side surface of the positive lens in the cemented lens, and a radius of curvature Ri of an image-forming side surface of the positive lens in the cemented lens satisfy the following conditions $0 < |f2/Lf23| < 0.3$ $-2.0 < Ri/Ro < -1.0$ $0.25 < fw/f3 < 0.45.$ 2. The zoom lens system according to claim 1, wherein the following condition is also satisfied $-1.7 < Ri/Ro < -1.15.$ 3. The zoom lens system according to claim 1, wherein the meniscus lens of the second lens group is a plastic lens and the another surface of the meniscus lens is aspherical.

4. The zoom lens system according to claim 1, wherein the negative lens and the positive lens of the first lens group, the cemented lens of the second lens group, and the positive lens of the third lens group are glass lenses.

5. The zoom lens system according to claim 1, wherein an object side surface of the positive lens of the first lens group is aspherical.

6. A camera comprising:
    the zoom lens system according to claim 1; and
    an image pickup device disposed on the image-forming side of the zoom lens system.

7. An information terminal comprising:
    the camera according to claim 6; and
    a display device capable of displaying images from the images pickup device.

* * * * *